2,992,248
PROCESSES FOR PREPARING HALO GROUP III-A HYDRIDES AND HALO GROUP III-A HYDROCARBONS

Tillmon H. Pearson, Baton Rouge, La., assignor to Ethyl Corporation, New York, N.Y., a corporation of Delaware
No Drawing. Filed Apr. 10, 1957, Ser. No. 651,802
9 Claims. (Cl. 260—429)

This invention is concerned with the production of halo metal hydrides and certain uses thereof. It is especially concerned with the halo metal hydrides of elements of group IIIA of the periodic table, particularly aluminum.

A process which is known for the preparation of halo aluminum hydrides is that described by Wiberg et al. in "Z. Naturforschg," 6B, 458–461 (1951). Briefly the process involves the reaction of aluminum hydride with an aluminum halide to produce the corresponding halo aluminum hydrides. This process is not attractive on a commercial scale because of certain inherent disadvantages. In particular, a convenient method for the preparation of the required aluminum hydride has not as yet been found. This material has heretofore been known as an expensive chemical curiosity which is prepared by the reaction of lithium hydride and aluminum chloride according to the empirical equation:

$$3LiH + AlCl_3 \rightarrow AlH_3 + 3LiCl$$

The process is carried out in ether solution. Since lithium hydride is expensive, aluminum hydride has not been a readily available chemical of commerce. Further, an ether-free aluminum hydride has been unobtainable.

The process steps required by the above technique are time consuming, difficult and limiting toward the production of halo aluminum hydrides. It has now been discovered that the preliminary preparation of a group IIIA metal hydride is not required for the manufacture of the corresponding halo metal hydride. A further advantage of the new process is that it avoids the use of the expensive alkali metal hydrides, particularly lithium hydride.

An object of the present invention is to provide a novel process for the production of halo metal hydrides, particularly of the group IIIA elements. A further object is to provide a process for producing these materials in higher yields and more economically than heretofore obtainable. A particular object is to provide a process for producing halo aluminum hydrides which does not involve the use of the metal hydride per se. Other objects will be evident as the discussion proceeds.

The above and other objects of this invention are accomplished by reacting a group IIIA element with a halide thereof and hydrogen at supraatmospheric pressure. The conditions under which the reaction is conducted are subject to considerable latitude. However, advantages, particularly of higher yield and more efficient operation, are obtained when certain additional features brought forth in more detail hereafter are practiced. For example, in preferred embodiments of this invention, the reaction is conducted at a temperature between about 80 and 150° C. and a pressure between about 1,000 to 10,000 pounds per square inch guage (p.s.i.g.). Likewise, a still more preferred embodiment comprises conducting the reaction in the presence of an organic liquid media. In this instance the amines are especially preferred since they are particularly suitable reaction promoting media. Thus, an especially preferred embodiment of this invention is the reaction of aluminum with aluminum chloride and hydrogen at between about 80 and 150° C. and 1,000 to 10,000 p.s.i.g. in the presence of triethyl amine to produce the corresponding chloro aluminum hydride, particularly aluminum dichloro hydride.

The process of this invention is particularly advantageous in that it eliminates the formation of the unstable and scarce metal hydrides and requires only economical constituents, namely the metal, a halide thereof, and hydrogen, e.g., aluminum, aluminum chloride and hydrogen.

The products produced by this process are of considerable utility. For example they can be employed in hydrogenation reactions. A particular use, however, which forms an additional embodiment of this invention is their reaction with olefins to produce organometallic halides. The latter products can be further reacted with alkali metals or alkali metal hydrides to produce the fully alkylated group IIIA organometallic or the organometallic hydride compounds, respectively. A preferred example of this embediment is the reaction of aluminum with aluminum chloride and hydrogen to produce aluminum dichlorohydride, and then reacting this product with ethylene to produce the corresponding ethyl aluminum chloride.

The metal employed is an element of group IIIA of the periodic table (Handbook of Chemistry and Physics, 35th edition, page 393) namely boron, aluminum, gallium, indium, and thallium. The true metals of this group especially aluminum, are particularly preferred because of their greater reactivity. The metal halides are the corresponding halides of these metals, for example, the fluorides, chlorides, bromides or iodides. Typical examples of the metal halides thus include aluminum trichloride, bromide, fluoride, or iodide; gallium iodide; boron trichloride; thallium bromide; indium iodide and the like. However, mixed halides can also be employed, such as, for example, aluminum chlorobromide, gallium fluorochloride, indium iodo bromide and the like. It is especially preferred to employ aluminum and aluminum chloride in the process of this invention because of their greater availability, economy and the higher yields obtained.

The condition of the metal employed is not critical, however, for practical purposes it is employed in comminuted or subdivided form. Such forms of the metal can be obtained by known procedures. For example, aluminum can be supplied in comminuted form as aluminum shavings prepared under nitrogen or a suitable diluent. The metal can also be prepared by chemical techniques such as reduction from their ores. Metal powders produced by atomization can also be employed. The metal can also be ball-milled, if desired under suitable diluents, to achieve small particles. To further activate the metal powder, pretreatments can be made if desired. A typical example is the pretreatment of inactive aluminum powder with an organometallic compound, particularly triethylaluminum and diethyl aluminum hydride, at an elevated temperature. Other forms and methods of pretreament of the metal will be evident. It is to be noted that generally such treatments and forms are not applicable when gallium metal is employed since this metal is usually liquid under most reaction conditions.

The process of this invention will be further understood by reference to the following examples wherein all parts are by weight.

Example I

To a high pressure rocking autoclave equipped with external heating means was added 29 parts of triethyl amine, 12 parts of aluminum chloride and 4 parts of aluminum obtained by milling an aluminum rod under hexane. The autoclave was purged by pressurizing with 400 to 600 p.s.i.g. of hydrogen and venting, It was then repressurized to 9,000 p.s.i.g. with hydrogen and heat applied to raise the temperature to 135° C. These conditions were maintained for 3 hours, although reaction was essentially complete in the short period required to reach 135° C. The takeup of hydrogen was 720 p.s.i.g. after cooling. The autoclave was then vented and its contents were filtered with washing of the solids employing diethyl ether. The filtrates were then combined with additional diethyl ether to result in a total of 75 parts. This solution containing the principal product, dichloro aluminum hydride, dissolved therein was hydrolyzed with water and the amount of hydrogen gas evolved was measured. The amount of hydrogen collected was 0.22 part. Thus, the yield based upon the aluminum chloride was 83 percent.

The temperature employed in the process of this invention is not critical and can be varied over a wide range. In general, reaction will occur at room temperature, 25° C., and temperatures as high as 250° C. and higher can be employed. In order to obtain the best yields, fast reaction rates, and greater stability of the product, it is preferred to employ a temperature between about 80 to 150° C.

The pressure which is employed is supraatmospheric pressure. Generally speaking, the highest pressure which is employed is of the order of 50,000 p.s.i.g., limited mainly by practical considerations. Pressures as low as about 15 p.s.i.g. can also be employed. For the most economical process for producing the halo metal hydrides in high yield at a fast reaction rate, it is preferred to employ a pressure between about 1,000 to 10,000 p.s.i.g.

The proportions of the reactants are not critical. In general at least a sufficient amount of the metal, metal halide, and hydrogen are employed to produce the dihalo metal monohydride. The proportions can be varied, however. For example an excess of either the metal or the metal halide can be employed in the presence of a hydrogen atmosphere under the pressures described above in order to obtain satisfactory results. It has been found, however, than an enhancement in yield is obtained when an excess of the metal is employed. Generally the excess will be between about the stoichiometric amount and 100 percent in excess or even higher. The amount of excess metal employed is not critical since the metal is readily recovered by conventional techniques such as filtration and reused by recycling. For ease of handling, size of the reaction equipment, and optimum conditions, between about the stoichiometric amount and 25 percent in excess thereof of the metal is employed.

Although it is indicated in Example I that an organic liquid medium is employed during the course of the reaction, such is not essential. The reaction can be conducted in the absence of such media. However, since the metal and, in many cases, the metal halide are generally solid under reaction conditions, it is desirable to employ a liquid medium for ease of handling and maintaining better contact of the reactants. For this purpose the usual organic solvents can be employed. General criteria for the media to be employed are that they be liquid under the reaction conditions, essentially inert, and preferably capable of dissolving the product produced. Typical examples of organic media which can be employed include the hydrocarbons, ethers, and amines, generally having a total of not over about 20 carbon atoms therein. Among the hydrocarbons that can be employed are the hexanes, nonanes, octadecanes, benzene, toluene, cyclohexane, tetrahydronaphthylene, diesel oil, gasoline and the like.

The ethers and amines comprise particularly advantageous media since they are reaction promoters. When such media are employed, it has been found that higher yields are obtained. Among the ethers which can be used are included, for example, diethyl ether, di-n-butyl ether, n-amylmethyl ether, dibenzyl ether, methylphenyl ether, the diethyl ether of diethylene glycol, the dimethyl ether of diethylene glycol, dioxane, tetrahydrofuran, and the like.

The amines comprise a particularly preferred group of media to be employed in this process. The amines are more advantageously employed than are the ethers, since the latter are generally susceptible to some cleavage during the reaction. Among such reaction promoting amines which can be employed are included the primary, secondary, and tertiary, alkyl, aryl, and cyclic amines. Typical examples of such amines include methyl, hexyl, ethyl and the like amines, isobutyl amines, diethyl amine, dibutyl amine, aniline, pyridine, amyldiphenyl amine, p-isobutyl aniline, diphenyl amine, cyclohexyl amine, triethyl amine, isoquinoline, o-ethyl pyridine, trimethyl amine, and the like. The tertiary amines are particularly well suited toward obtaining high yields.

The above are intended merely as illustrations of the organic diluents to be employed in the process and other examples will be evident.

The following examples will illustrate additional embodiments of this invention.

*Example II*

The procedure of Example I was followed essentially as described with exception that 12.3 parts of aluminum iodide were employed rather than aluminum chloride, the temperature was 125° C. and the pressure was 4,900 p.s.i.g. for a reaction period of 3½ hours. The total pressure drop after cooling was 120 p.s.i.g. The yield of diiodo aluminum hydride was 75 percent.

*Example III*

The procedure of Example I is repeated with exception that the pressure is 50,000 p.s.i.g. and the temperature is 30° C. Dichloroaluminum hydride is recovered in high yield.

*Example IV*

When 12 parts of aluminum bromide are reacted with 4 parts of aluminum employing 30 parts of tetrahydrofuran as a diluent under 75 p.s.i.g. of hydrogen at 250° C. for 5 hours, dibromoaluminum hydride is obtained in high yield.

*Example V*

When aluminum fluoride is substituted for aluminum chloride and dioxane is substituted for triethyl amine in Example I, an essentially quantitative conversion of the aluminum fluoride to difluoroaluminum hydride is obtained.

*Example VI*

Example I is repeated with the exception that the temperature employed is 150° C., the hydrogen pressure employed is 10,000 p.s.i.g. and benzene is employed as the diluent. In this instance, upon completion of reaction, dichloroaluminum hydride is obtained dissolved in the benzene after filtration from unreacted aluminum.

*Example VII*

The procedure of Example II is repeated with exception that 10 parts of boron are reacted with essentially stoichiometric amounts of borontrichloride and hydrogen under the conditions recited. Dichloroboron hydride is produced in high yield.

*Example VIII*

A high yield of diiodo thallium hydride is obtained when a 25 percent excess of thallium metal is reacted with thallium iodide and hydrogen in pyridine.

Similarly, satisfactory results are obtained when gallium and indium and their respective halides are substituted for the metals and metal halides employed in the Examples I through VIII. In place of the particular diluents recited in the aforementioned examples, good results are obtained when aniline, diethyl amine, p-ethyl pyridine, isoquinoline and the like amines; furan, the dimethyl ether of diethylene glycol, dioxane, dimethyl ether, dibenzyl ether and the like ethers; and hydrocarbons such as nonane, cyclohexane, and toluene are substituted for the various solvents employed therein.

The halo metal hydrides are generally used while dissolved in the organic media as formed in the above examples. If desired, they can be separated from such media by conventional techniques such as vacuum distillation.

Commercially available hydrogen is suitable in the process of this invention including both atomic and molecular hydrogen. If desired, the hydrogen can be further purified by standard techniques. Of course, for specialty purposes, deuterium and tritium are the equivalent of hydrogen in this process.

As indicated previously a particular use of the products of this invention is their subsequent olefination to produce the corresponding organometallic halides. In this connection, particular advantage is achieved in process and ultimate yield of the organometallic halide when the preparation of the halo metal hydride is combined with olefination. It will be recognized that in this combined operation, the organometallic halides are readily obtained from basic constituents, namely, the metal, its halide, hydrogen and an olefin. Generally the olefination operation is conducted at a temperature between about 50 to 300° C. at atmospheric or supraatmospheric pressure. It is preferable to conduct this operation at between about 90 and 200° C. and pressures between 750 and 7,500 p.s.i.g., in order to avoid polymerization of the olefin employed. A great variety of olefins can be employed; however, alpha olefins are particularly preferred because of their high reactivity. Typical examples of olefins which can be employed include ethylene, propylene, alpha butylene, alpha hexylene, styrene, and the like. Ethylene is a preferred olefin because of its greater availability and reactivity.

The following example will demonstrate this particular combination.

Example IX

The procedure of Example I is repeated with exception that at the completion of the reaction the reaction mixture is not further processed. Instead, the hydrogen is vented and ethylene is pressurized into the autoclave to a pressure of 1,000 p.s.i.g. with the temperature being maintained at 100° C. for 4 hours. Ethylaluminumdichloride is obtained in high yield.

Similar results are obtained when the products produced in Examples II through VIII are reacted with ethylene or other olefins. For example, when the product of Example II is reacted with alpha butylene, butyl aluminum iodide is obtained in high yield. Furthermore, when reacting the dibromoaluminum hydride product of Example IV with styrene at 90° C. and 4,000 p.s.i.g., styryl aluminum bromide is obtained. Additionally when dichloroboronhydride is reacted at 150° C. and 6,000 p.s.i.g with isobutylene, isobutylborondichloride is obtained.

Generally, if desired, the reaction media employed in this step can be any of those previously mentioned in connection with the preparation of the halo metal hydrides.

It is to be noted that under certain conditions of preparing the halo metal hydride described above, the monohalo metal dihydride is produced. A corollary, therefore, is that, upon olefination of this product, the diorgano metal monohalide is produced.

The organometallic halide produced as described above is of considerable utility. For example, it can be reacted with an alkali metal or an alkali metal hydride to produce the fully alkylated group IIIA organometallic compound or the organometallic hydride compounds respectively. For such utility, reference can be had to K. Ziegler, Angew. Chemie., 1952, 64, 323, 330; K. Ziegler et al., Annalen, 1954, 589, 91; A. Von Grosse et al., J. Org. Chem., 1940, 5, 106; R. W. Auten et al., J. Amer. Chem. Soc., 1952, 74, 3398; and U.S. Patents 2,691,668, and 2,765,329. Thus, for example ethylaluminumdichloride can be reacted with sodium hydride in hexane at 100° C. for about 4 hours to produce diethylaluminum hydride, ethylaluminum dihydride, and triethylaluminum. Likewise ethylboron dichloride produced according to Example IX can be reacted with sodium to produce triethylboron. These and other examples of the use of such compounds will be evident.

From the above discussion it is evident that the process of this invention is capable of many varied embodiments. It is not intended that it be limited except as set forth in the following claims.

I claim:
1. A process for preparing a halo group IIIA hydride which comprises reacting a group IIIA element with a halide thereof and hydrogen at supraatmospheric pressure.
2. A process which comprises reacting aluminum with aluminum chloride and hydrogen at supraatmospheric pressure to produce dichloroaluminum hydride.
3. The process of claim 2 wherein the reaction is conducted at a temperature between about 80 and 150° C. and a pressure between about 1,000 to 10,000 p.s.i.g. in the presence of an amine.
4. A process for preparing a halo group IIIA hydrocarbon compound which comprises reacting a group IIIA element with a halide thereof and hydrogen at supraatmospheric pressure until the reaction is essentially complete, venting essentially all the unreacted hydrogen from the reaction system, and reacting the product thereby produced with an alpha olefin.
5. A process for preparing a chloro aluminum ethyl compound which comprises reacting aluminum, aluminum chloride, and hydrogen at between about 80 and 150° C. and between about 1,000 to 10,000 p.s.i.g. until the reaction is essentially complete, venting essentially all the unreacted hydrogen from the reaction system, and reacting the product thereby produced with ethylene at 90 to 200° C. and 750 to 7,500 p.s.i.g.
6. A process for preparing a halo group IIIA hydride which comprises reacting a group IIIA element with a halide thereof and hydrogen at a temperature between about 80° and 150° C. and at superatmospheric pressure.
7. A process for preparing a halo group IIIA hydride which comprises reacting a group IIIA element with a halide thereof and hydrogen at a temperature between about 80° and 150° C. and at a pressure between about 1,000 and 10,000 p.s.i.g.
8. The process of claim 7 wherein the reaction is conducted in an organic liquid medium selected from the group consisting of hydrocarbons, ethers and amines having up to about 20 carbon atoms in the molecule.
9. The process of claim 7 wherein the reaction is conducted in a liquid amine having up to about 20 carbon atoms in the molecule.

References Cited in the file of this patent
UNITED STATES PATENTS 2,271,956    Ruthruff _____ Feb. 3, 1942

FOREIGN PATENTS 1,122,000    France _____ May 14, 1956

OTHER REFERENCES

Wiberg: "New Results in Preparative Hydride Research," AEC-tr-1931, Apr. 8, 1954.

Wiberg et al.: "Zeitschrift für Naturforschung," vol. 6B, pages 333–334 (1951).

Babor et al.: "General College Chemistry," 1940, page 88.